US012638910B2

(12) United States Patent
Fletcher et al.

(10) Patent No.: US 12,638,910 B2
(45) Date of Patent: May 26, 2026

(54) HUMAN MACHINE INTERFACE DEVICE FOR COMMUNICATING TOUCH INTERACTION

(71) Applicant: TACYT LIMITED, London (GB)

(72) Inventors: Henry Matthew Lawrence Fletcher, London (GB); James Edward Buckley, London (GB); David Kassim Mohamad, London (GB); Christian Valentine Burton, London (GB); Ian Tomlinson, London (GB)

(73) Assignee: TACYT LIMITED, London (GB)

( * ) Notice: Subject to any disclaimer, the term of this patent is extended or adjusted under 35 U.S.C. 154(b) by 144 days.

(21) Appl. No.: 18/293,641

(22) PCT Filed: Aug. 4, 2022

(86) PCT No.: PCT/EP2022/071983
   § 371 (c)(1),
   (2) Date: Jan. 30, 2024

(87) PCT Pub. No.: WO2023/012286
   PCT Pub. Date: Feb. 9, 2023

(65) Prior Publication Data
   US 2024/0342915 A1      Oct. 17, 2024

(30) Foreign Application Priority Data

Aug. 5, 2021   (GB) ...................................... 2111312
   Jun. 22, 2022   (GB) ...................................... 2209138

(51) Int. Cl.
   G06F 3/01      (2006.01)
   B25J 9/16      (2006.01)
   G05B 11/42      (2006.01)

(52) U.S. Cl.
   CPC ...... G06F 3/01 (2013.01); B25J 9/16 (2013.01); G05B 11/42 (2013.01); G06F 3/016 (2013.01); B25J 9/1689 (2013.01); G06F 3/011 (2013.01)

(58) Field of Classification Search
   CPC .............. G06F 3/00; G06F 3/01; G06F 3/011; G06F 3/016; G06F 3/0488; G06F 3/14; (Continued)

(56) References Cited

U.S. PATENT DOCUMENTS 5,984,880 A      11/1999   Lander et al.
6,639,582 B1      10/2003   Shrader
(Continued)

FOREIGN PATENT DOCUMENTS

| EP | 1521434 A1 | 4/2005 |
| ES | 2319047 A1 | 6/2007 |
| GB | 2416962 A | 2/2006 |

OTHER PUBLICATIONS

GB Application No. GB2209138.3, United Kingdom Intellectual Property Office Examination Report dated Mar. 15, 2024, 5 pages.
(Continued)

*Primary Examiner* — Van T Trieu
(74) *Attorney, Agent, or Firm* — Quarles & Brady LLP

(57) ABSTRACT

A human-machine interface device is provided for communicating touch interaction between two users. The device comprises: a drive mechanism, an interaction element, a sensor, a network connection, and a controller. The drive mechanism is configured to apply a drive force to the interaction element. The sensor is configured to measure interaction by a user with the interaction element so as to obtain interaction data. The network connection is configured to transmit the interaction data to a corresponding human-machine interface device and receive remote interaction data from the corresponding human-machine inter-
(Continued)

face device which is indicative of a second user's interaction with the corresponding device. The controller is configured to control the drive mechanism such that a force is applied to the interaction element based on the remote interaction data.

19 Claims, 11 Drawing Sheets

(58) Field of Classification Search
CPC ......... G06F 3/1454; G09G 5/12; G05B 11/42; B25J 9/16
See application file for complete search history.

(56) References Cited

U.S. PATENT DOCUMENTS

| | | | |
|---|---|---|---|
| 8,294,557 B1 | 10/2012 | El Saddik et al. | |
| 8,508,469 B1 | 8/2013 | Rosenberg et al. | |
| 9,104,271 B1 * | 8/2015 | Adams ................. | G06F 3/0233 |
| 2002/0082724 A1 | 6/2002 | Hennion | |
| 2002/0191011 A1 | 12/2002 | Rasouli | |
| 2005/0235032 A1 | 10/2005 | Mason | |
| 2009/0253109 A1 | 10/2009 | Anvari et al. | |
| 2012/0142416 A1 | 6/2012 | Joutras | |
| 2016/0048368 A1 * | 2/2016 | McGibney ........... | G06F 40/109 |
| | | | 345/2.3 |
| 2017/0193767 A1 | 7/2017 | Foxlin et al. | |
| 2020/0257362 A1 | 8/2020 | Want et al. | |
| 2021/0149492 A1 | 5/2021 | Dobson | |
| 2023/0144426 A1 * | 5/2023 | Ma ........................ | G09G 5/397 |
| | | | 348/521 |

OTHER PUBLICATIONS

International Search Report and Written Opinion, PCT/EP/2022/071983, International Searching Authority European Patent Office, dated Nov. 25, 2022, 13 pages.
GB Combined Search & Examination Report, GB Application No. 2209138.3, dated Jan. 31, 2022, 11 pages.
GB Examination report, GB Application No. 2111312.1, dated Sep. 23, 2022, 9 pages.
GB Examination report, GB Application No. 2111312.1, dated Jun. 14, 2022, 10 pages.
GB Examination report, GB Application No. 2111312.1, dated Sep. 6, 2023, 5 pages.
GB Combined Search & Examination Report, GB Application No. 2111312.1 dated Jan. 31, 2022, 13 pages.
"What is Telehaptics?", Interactivity Consultants 2003, 1 page.
Ni et al, 2007, "A Human-to-human Force-reflecting teleoperation system using fuzzy logic cotroller tuning" (J. Intell. Robot. Syst.), 16 pages.
Telehaptics, Wikipedia, Anon, 2020, 3 pages.

* cited by examiner

Detail A

100=15    3

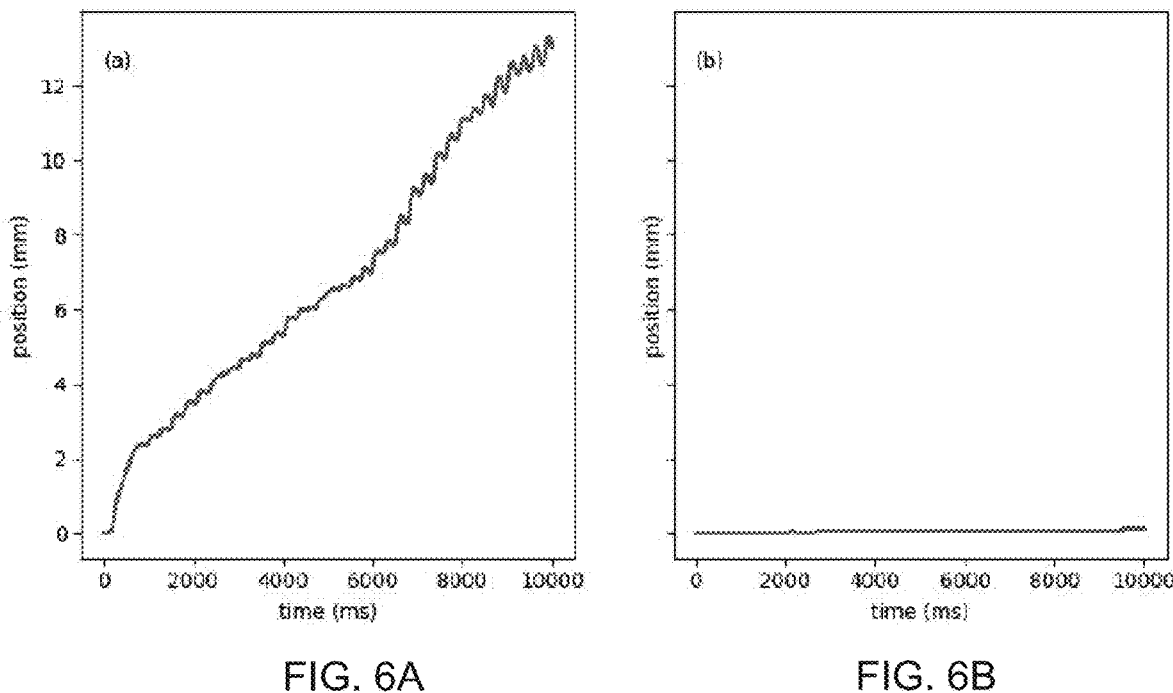
FIG. 6A          FIG. 6B
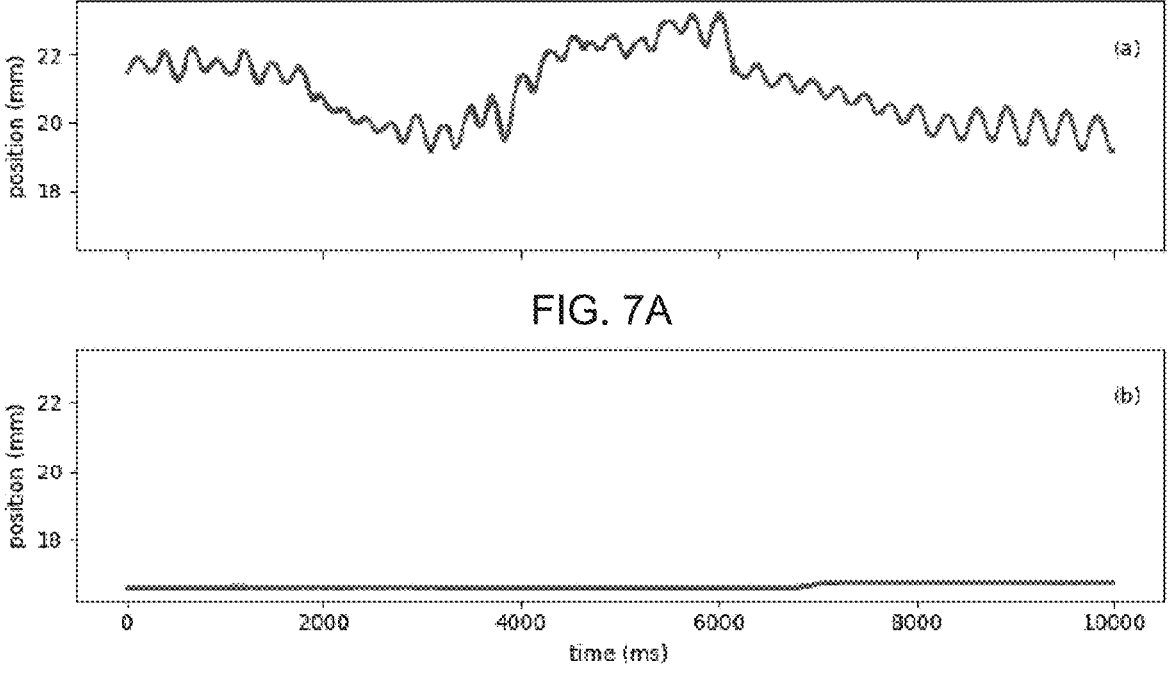
FIG. 7A
FIG. 7B

HUMAN MACHINE INTERFACE DEVICE FOR COMMUNICATING TOUCH INTERACTION

RELATED APPLICATIONS

This application is a 35 U.S.C. § 371 national phase application of PCT/EP2022/071983 (WO-2023/012286 A1), filed on Aug. 4, 2022, entitled "HUMAN MACHINE INTERFACE DEVICE FOR COMMUNICATING TOUCH INTERACTION", and claims priority to GB-2111312.1 filed on Aug. 5, 2021, and GB-2209138.3 filed on Jun. 22, 2022, the disclosures of which are incorporated herein by reference in their entirety.

FIELD OF THE INVENTION

The present invention relates to human-machine interface device for transmitting and receiving a human interaction on a network and a system of human-machine interface devices.

BACKGROUND

People are increasingly relying on the internet to communicate with each other through text, video, and audio exchanges. However, these exchange formats do not allow for tactile communication between people.

Therefore, a human-machine interface device is desired which can transmit and receive force and displacement information to and from a corresponding device in a remote location to replicate a form of human tactile communication. For instance, a user may move a local object. Force and displacement information is transmitted to a remote object such that the force applied to the local object is replicated in near real time for the remote object.

Correspondingly, another user may move the remote object which results in a corresponding force being applied to the local object. Thus, a feeling is produced of the two users holding the same object.

The Internet of Things includes many devices that allow users to remotely connect to, control, and move devices. For instance, the movement of a joystick can be used to control a drone or a camera. However, these devices do not provide two-way communication of force and displacement information between users.

Moreover, humans are very good at sensing small forces and displacements such as vibrations or oscillations of objects they are holding. Movements or displacements that are a result of device mechanics rather than a force applied by the remote user would be sensed by the local user and the tactile communication would not feel authentic. Additionally, humans are very good at sensing small delays in touch. For instance, humans can sense touch inputs that are spaced approx. 10 ms apart. Thus, system latencies which are too large may be sensed by the local user and the tactile communication would not feel authentic. Therefore, a human-machine interface device is desired which is able to measure, communicate, and produce small forces and displacements in line with the human sense of touch.

SUMMARY

Accordingly, in embodiments of a first aspect of the invention a human-machine interface device for communicating touch interaction between two users comprises:

an interaction element,
a drive mechanism configured to apply a drive force to the interaction element,
a sensor, configured to measure interaction by a user with the interaction element so as to obtain interaction data,
a network connection configured to transmit the interaction data to a corresponding human-machine interface device and receive remote interaction data from the corresponding human-machine interface device which is indicative of a second user's interaction with the corresponding device, and
a controller configured to control the drive mechanism such that a drive force is applied to the interaction element based on the remote interaction data.

The invention includes the combination of the aspects and preferred features described except where such a combination is clearly impermissible or expressly avoided.

Optional features of the invention will now be set out. These are applicable singly or in any combination with any aspect of the invention.

The human-machine interface device may further comprise an optical sensor configured to obtain optical data which may form a part of the interaction data. The human-machine interface may further comprise a temperature sensor configured to obtain temperature data which may form a part of the interaction data.

For example, the optical sensor may be a digital camera, photodiode, or charge-coupled device. The optical sensor may be configured to sense the visual appearance of a part of the user via which the user interacts with the interaction element, e.g. the user's finger/hand. For example, the optical sensor may be a colour sensor and configured to sense colour characterising the part of the user, or a light level proximal to the optical sensor. The temperature sensor may be configured to sense temperature characterising a part of the user via which the user interacts with the interaction element, e.g. a user's finger/hand. In this way, more comprehensive interaction data can be obtained to characterise the interaction between the user and the interaction element. The temperature sensor may be, for example, a thermocouple, resistance temperature detector, thermistor, or semiconductor-based temperature sensor.

The sensor configured to measure interaction by a user with the interaction element so as to obtain interaction data may be referred to as an interaction sensor. The various sensors may be separate to the drive mechanism. Advantageously, providing the sensor(s) separate to, i.e. physically distinct from, the drive mechanism facilitates more sensitive measurement of the interaction by a user. This is because the drive mechanism is less likely to interfere with sensor measurements when the sensor is installed separately from the drive mechanism. For example, a separate sensor is less likely to measure mechanical interactions caused by the drive mechanism itself rather than by the user.

Additionally, any one or any combination of the interaction sensor, the optical sensor, and the temperature sensor may be positioned on an external face of the interaction element. This can result in a more accurate measurement of the interaction by the user than if the sensor(s) were located elsewhere, for instance proximal to the drive mechanism. For instance, if the interaction sensor is a force sensor configured to measure an external force applied by a user, the user can apply the external force directly to the force sensor, for example by pushing on it. When the human-machine interface device comprises a temperature sensor, the user can directly contact the temperature sensor, e.g. using their finger/hand, and thus a more accurate measurement of the temperature of e.g. the user's finger/hand can be obtained. Similarly, when the human-machine interface device includes a optical sensor, e.g. a camera, positioned on an external face of the interaction element, a direct line of view may exist between the optical sensor and the user, e.g. their finger/and, to better sense.

As already mentioned, the interaction sensor may be a force sensor configured to measure an external force applied to the interaction element by the user, the interaction data comprising the external force. For example, the force sensor may comprise a load cell, strain gauge or force sensing resistor.

The remote interaction data may also comprise a force corresponding to an external force measured on the corresponding remote human-machine interface device.

When the interaction sensor is a force sensor, the human-machine interface device may further comprise a movement sensor configured to measure displacement (or movement) of the interaction element due to the external force applied to the interaction element by the user, the measured displacement (or movement) forming a part of the interaction data. For instance, the movement sensor may be an IMU (inertial measurement unit) or a range-finder. Conveniently, the remote interaction data may comprise displacement (or movement) information measured by a movement sensor on the corresponding human-machine interface device.

The remote interaction data may additionally comprise a temperature and/or optical data obtained respectively from remote temperature and optical sensors. The remote interaction data may also comprise telemetry information including a position and/or velocity of the remote interaction element. Thus, in one example, the remote interaction data may include just a force, a displacement, and optical data. In another example, the remote interaction data may include just a force, a displacement, and temperature data.

The human-machine interface device may further comprise a display element configured to operate based on the remote interaction data comprising optical data and/or a temperature modifying device configured to vary its temperature based on the remote interaction data comprising temperature data. For example, the display element may display an image matching an image comprised in the remote interaction data or a colour matching a colour comprised in the remote interaction data. The temperature modifying device may vary its temperature to match a temperature comprised in the remote interaction data. For example, the temperature modifying device may be a Peltier-based device, operable either to raise or lower the temperature depending on a direction flow of the current passed through the device.

Thus, the human-machine interface device can more authentically simulate an interaction between a user of the interaction element and a user of the remote interaction element. The temperature modifying device and/or the display element may be controlled by the controller. Conveniently, the controller may comprise a memory device for storing a previous position of the interaction element, and/or a previous temperature of the temperature modifying device, and/or a previous display on the display element and/or telemetry information of the interaction element. A position, a temperature, a colour and/or telemetry information received as remote interaction data may also be stored.

The interaction element may move at a velocity according to the net sum of the drive force and the external force applied by the user. For instance, if an external force is applied which is in opposition to and in excess of the drive force, the interaction element may be allowed to slip in the drive mechanism or manually drive the drive mechanism in reverse. Thus, the interaction element is moved in an opposite direction to the direction in which the drive mechanism is driving it.

Instead of a force sensor, the sensor may be a movement sensor configured to measure movement or displacement of the interaction element due to the drive force and an external force. For instance, the measurement sensor may be an IMU (inertial measurement unit) or a range-finder. Conveniently, the remote interaction data may comprise movement or displacement information measured by a movement sensor on the corresponding human-machine interface device.

The interaction element may be a pin configured to move reciprocally along its longitudinal axis. In other examples, the interaction element may be a panel, a member, a surface, or another geometry capable of being moved in response to both the local user and the remote interaction data.

The interaction element may be identical or substantially identical to the remote interaction element.

The drive mechanism may be a stepper motor. Alternatively, the drive mechanism may be a brushless motor, a servo motor, a hydraulic piston, or a pneumatic piston. The drive mechanism may also control the interaction element using electromagnets. In this case, a received force from the corresponding human-machine interaction device may be replicated by controlling a variable resistance which resists the movement of the interaction element. The drive mechanism may comprise a separate position encoder to measure a current position of the interaction element.

Alternatively, the interaction element may comprise one or more flexible membranes encasing a fluid. In this case, the drive mechanism may be a pump which can increase or decrease the fluid pressure inside the flexible membrane by draining or adding fluid. The sensor may be a pressure sensor or, alternatively, the sensor may measure an amount of fluid which is entering or exiting the space defined by the flexible membrane via an exit conduit.

Conveniently, the interaction data may comprise a current position of the interaction element. Accordingly, the remote interaction data may also comprise a current position of an interaction element on the corresponding human-machine interface device.

The controller may be configured to:
determine a target position for the interaction element based on the interaction data and the remote interaction data, and
control the drive mechanism such that it attempts to move the interaction element towards the target position.

In this way, the system is sensitive to small adjustments and may be adjusted in a manner which feels authentic. For example, the controller may be configured such that it controls the drive mechanism to move the interaction element within 10 ms-1000 ms of the HMI device receiving the remote interaction data. The drive mechanism may move the interaction element within 30 ms-300 ms, within 20 ms-200 ms, and/or within 10 ms-100 ms of the HMI device receiving the remote interaction data.

Alternatively, a drive force or torque may be determined based on the interaction data and the remote interaction data. Thus the controller may be configured to control the drive mechanism such that it attempts to move the interaction element according to a target force or torque. For example, the drive force may be adjusted according to the target force. The target force may be calculated based on the interaction data and the remote interaction data. For example, when the sensor is a force sensor configured to measure an external force applied to the interaction element by the user, the interaction data comprises the external force, and/or the remote interaction data comprises a remote external force, the target force may be calculated based on the external force measured by the force sensor and/or the remote external force received as remote interaction data.

Additionally or alternatively, the target force may be calculated based on an inertial component. The inertial component may be based on an acceleration and a mass of the interaction element. The acceleration of the interaction element may be calculated by determining a displacement of the interaction element over a given period of time, e.g. over a time internal determined by a system tick such as 1 ms. For example, the displacement of the interaction element could be determined from a previous position and a current position of the interaction element spaced in time, e.g. by a system tick. The mass of the interaction element may be the interaction element's physical mass.

The inertial component may be calculated by considering the interaction element and the remote interaction element as two ends of a shared interaction element, i.e. two ends of the same interaction element. Thus, the interaction element and the remote interaction element can be configured to move with the same velocity and acceleration as if they are the same element. Thus, the inertial component can represent an inertial component of the shared interaction element comprising inertia from both the interaction element and the remote interaction element. Advantageously, this can also result in a higher fidelity system with reduced time delays.

The target force may also be calculated based on a friction component, such as an estimated friction component.

The controller may be configured to control the drive mechanism such that the drive force applied to the interaction element is adjusted to simulate a desired virtual mass of the interaction element. The drive force may be adjusted according to the target force, e.g. such that it is equal to the target force. The drive mechanism may simulate the desired virtual mass by providing an additional or reduced drive force to simulate an additional inertial component of the interaction element. The additional drive force required to simulate the additional inertial component may be calculated based on: $F(t)=M_v a(t)$ where $M_v$ is the desired virtual mass and $a(t)$ is the current acceleration of the interaction element. Thus, the drive force can be adjusted based on the interaction data and/or the remote interaction data and/or an inertial component and/or a friction component and/or an additional inertial component.

Corresponding calculations can be performed by a corresponding controller on a remote HMI device.

The controller may be configured to control the drive mechanism using a PID controller. Thus, the control of the interaction element can be tuned to optimise the movement of the interaction element. For instance, preference can be given to movements caused by human users and inconsistencies caused by mechanical elements can be filtered out.

The human-machine interface may further comprise one or more additional interaction elements, sensors (including colour sensors and/or temperature sensors), display elements, temperature modifying devices, and drive mechanisms. For instance, an array of pins may be provided to sense and replicate move complicated interactions by the user.

In a second aspect, a system is provided comprising two or more human-machine interface devices of the first aspect wherein:

the devices are linked by a network, and the interaction data from each device form the remote interaction data for the or each of the remaining devices.

The system may include a central processing unit linked to the devices by the network. The central processing unit may be configured in the same manner of the first aspect. For instance, the central processing unit may be configured to provide instructions to the controller of a given device such that the controller controls the drive mechanism such that a drive force is applied to the interaction element based on remote interaction data from another given device. When the human-machine interface device includes a temperature modifying device and/or a display element, the central processing unit may be configured to provide instructions to the controller of a given device such that the controller controls the heater and/or display element based on remote interaction data from another given device.

The system may be configured such that the drive mechanism moves the interaction element within 10 ms-1000 ms of a (remote) user interacting with the remote interaction element. The drive mechanism may move the interaction element within 30 ms-300 ms, within 20 ms-200 ms, and/or within 10 ms-100 ms of a user interacting with the remote interaction element.

In use, the motion of the interaction element may be counteracted by a force applied to the interaction element and vice versa. Thus, a feedback loop can be created. For example, each interaction by a user with the interaction element may be transmitted to a corresponding remote HMI device and may be integrated into the displacement and/or force of a corresponding remote interaction element within 10 ms-1000 ms, within 10 ms-400 ms, and/or within 10 ms-100 ms. Advantageously, as a result of this feedback loop, a user interacting with the (local) interaction element can have a more authentic experience of interacting with a remote user interacting with the corresponding remote interaction element.

In a third aspect, method is provided of using the human-machine interface device of the first aspect comprising:

obtaining interaction data from the sensor, transmitting the interaction data to the corresponding human-machine interface device via the network socket, receiving remote interaction data from the corresponding human-machine interface device via the network socket, and controlling the drive mechanism such that a drive force is applied to the interaction element based on the remote interaction data.

When the human-machine interface device includes a temperature modifying device and/or a display element, the method may additionally include a step of controlling the temperature modifying device and/or display element respectively to display and/or vary the temperature modifying device's temperature based on the remote interaction data.

BRIEF DESCRIPTION OF THE DRAWINGS

Embodiments of the invention will now be described by way of example with reference to the accompanying drawings in which:

FIGS. 6A and 6B show graphs of the time-varying position of interaction elements on local and remote human-machine interface devices when the devices are idling; the human-machine interface devices of FIG. 6A comprising built-in force sensors in the drive mechanisms and the human-machine interface devices of FIG. 6B comprising separate force sensors on the interaction elements;

FIGS. 7A and 7B show graphs of the time-varying position of interaction elements on local and remote human-machine interface devices when a user is holding one of the interaction elements; the human-machine interface devices of FIG. 7A comprising built-in force sensors in the drive mechanisms and the human-machine interface devices of FIG. 7B comprising separate force sensors on the interaction elements;

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
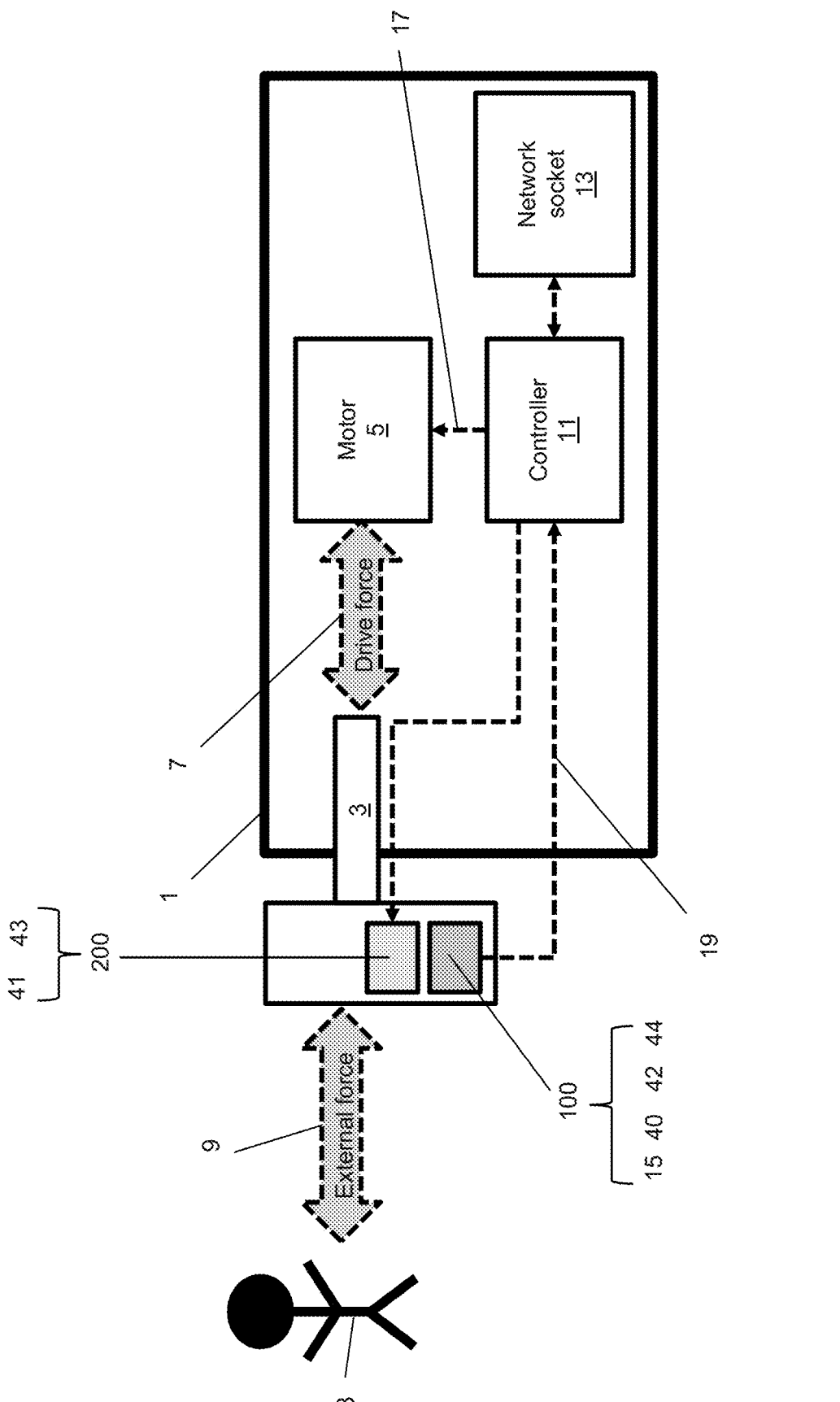
FIG. 1 shows a schematic a human-machine interface device.

FIG. 1 shows a schematic of a human-machine interface device 1. The device comprises an interaction element 3 such as a pin or rod. As discussed above, other interaction elements may be used such as surfaces, panels, members, or other suitable geometries. In further embodiments, the interaction element comprises one or more flexible membranes encasing a fluid. In these embodiments, the drive mechanism may be a pump which can increase or decrease the fluid pressure inside the flexible membrane by draining or adding fluid. A drive mechanism in the form of a motor 5 provides a drive force 13 to the interaction element which causes it to move. The interaction element may also be moved manually by a user applying an external force 9 to the interaction element. Thus, the motion of the interaction element depends on the direction and magnitude of the sum of the drive force and the external force. In this example, a sensory feedback module 200 is also provided physically separate to the drive mechanism 5, on an external face of the interaction element 3 so that it can be contacted/viewed by a user of the human-machine interface device 1. The sensory feedback module includes a display element 41 and a temperature modifying device 43. In this example the display element is configured to display colour while the temperature modifying device is configured to vary its temperature. For example, the display element may be an LED display, an LCD display or any other type of display which can statically or dynamically display colour. The temperature modifying device may be a Peltier based device or any other type of temperature modifying device which can vary its temperature (i.e. both increase and decrease) as required.

A controller 11 is provided to control the display element 41, the temperature modifying device 43, the drive mechanism 5 and the drive force 7. A position encoder (not shown, but which may be located within the motors themselves) reports a current location of the interaction element 3 to the controller. Similarly, a temperature encoder (not shown but which may be located in the heater itself) reports a current temperature of the temperature modifying device to the controller, while a colour encoder (also not shown but which may be located in the display element itself) reports a current colour of the display element to the controller. Additionally, a sensor module 100 is provided, physically separate to the drive mechanism, which measures a level of interaction by the user. The sensor module in this example includes a sensor 15 which is typically a force sensor, such as a load cell, which directly measures the external force 9 applied by the user to the interaction element. For example, the force sensor may be a Richmond 210 in-line load cell which is capable of measuring forces of 0 to 100 N. The measured external force is reported to the controller. In embodiments where the interaction elements comprise one or more flexible membranes encasing a fluid, the sensor 15 may be a pressure sensor configured to sense the pressure of the fluid, or the sensor may measure an amount of fluid entering or exiting the space defined by the flexible membrane via an exit conduit.

In this example, the sensor module 100 also includes a movement sensor 44, an optical sensor 40, and/or a temperature sensor 42. The movement sensor 44 is configured to measure displacement (or movement) of the interaction element due to an external force applied to the interaction element by a user so as to obtain displacement interaction data. For instance, the movement sensor may be an IMU (inertial measurement unit) or a range-finder. The optical sensor is configured to sense one or more optical properties so as to obtain optical interaction data, while the temperature sensor is configured to sense temperature so as to obtain interaction data. The optical sensor may be a digital camera, photodiode, or charge-coupled device. The optical sensor may be configured to sense, for example, colour characterising a part of the user via which the user interacts with the interaction element, e.g. a user's finger/hand. Similarly, the temperature sensor may be configured to sense temperature characterising a part of the user via which the user interacts with the interaction element, e.g. a user's finger/hand.

In this way, more comprehensive interaction data can be obtained to characterise the interaction between the user and the interaction element. The measured temperature, colour, and displacement are reported to the controller. The optical sensor 40 may be integrally formed with or provided by the display element 41, and the temperature sensor 42 may be integrally formed with or provided by the temperature modifying device 43.

The measured position, displacement, temperature, optical property, and external force 9 form interaction data which the controller provides to a network socket 13. The network socket 14 also allows for remote interaction data to be received from a remote human-interface device. A network interface is provided to allow the user to input desired system parameters such as a virtual mass or friction information (discussed below). For example, the network interface may be an external computer which connects to the controller via the network or a data input device which is installed on the human-machine interface device itself.

Figure 2:
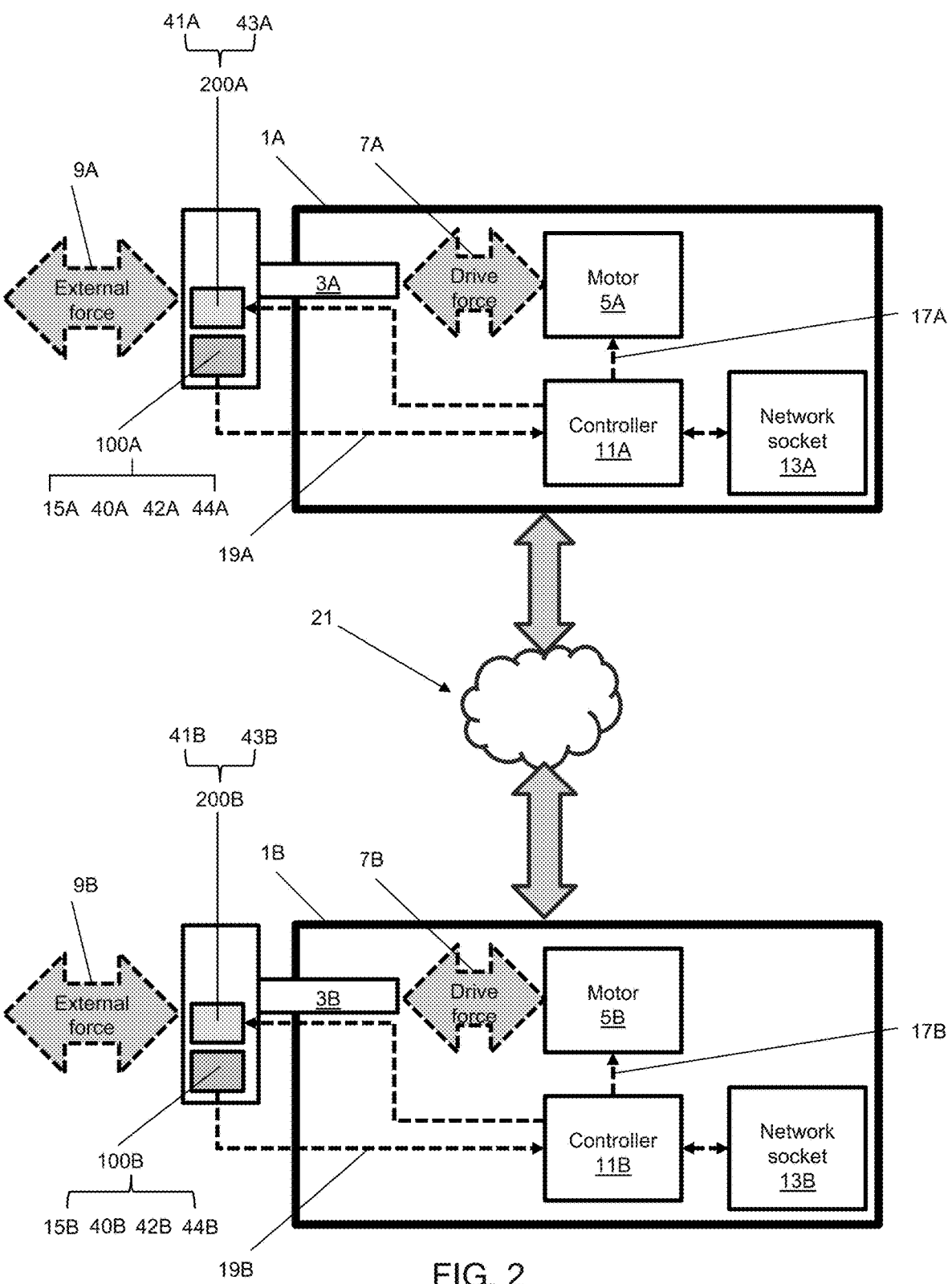
FIG. 2 shows a schematic of two human-machine interaction devices connected by a network.

FIG. 2 shows a schematic of a system comprising a local human-machine interface device 1A connected to remote human-machine interface device 1B by a network 21. Typically, the network is the internet. However, the network could also be a private wired or wireless connection. The interaction data provided, via the network socket 13B, to the controller 11B of the remote device form the remote interaction data received by the controller 11A, via the network socket 13A, of the local device. Thus, the remote interaction data contain a measured position of a remote interaction element 3B of the remote device, a measured displacement of the remote interaction element measured by a remote movement sensor 44B, a measured temperature (e.g. of a remote user's finger/hand) measured by a remote temperature sensor 42B, a measured optical property (e.g. of a remote user's finger/hand) measured by a remote optical sensor 40B, and a measured external force 9B applied to the remote interaction element.

The controller controls the drive mechanism 5A of the local device 1A such that the movement of the local interaction element 3A mirrors the movement of the remote interaction element 3B, informed by the remote interaction data. Furthermore, the controller controls the sensory feedback module 200A, i.e. the display element 41A and the temperature modifying device 43A, according to the remote interaction data.

Conveniently, the controller comprises a memory device (not shown) for storing a previous position of the interaction element 3A, a previous temperature of the temperature modifying device 43A, a previous display of the display element 41A and telemetry information of the interaction element 3A. A position, a displacement, a temperature, a display and/or telemetry information received as remote interaction data can also be stored. Thus, the interaction data and the remote interaction data are communicated and updated continuously so that changes in the position of the interaction element and in the measured temperature/optical property on one device result in corresponding changes in the position of the interaction element, in the temperature of the heater and in the display of the display element on the other device. In some scenarios, users may simultaneously apply external forces 9A 9B to the interaction elements 3A 3B of both devices 1A 1B. In this case, the drive mechanisms 5A 5B of each device would assert an opposing or assisting drive force 7A 7B on each device which mimics the measured external force of the other device. Thus, the drive mechanisms provide a resistance to the users, replicating a feeling that both users are interacting with the same interaction element.

Additionally, in some scenarios a user may apply an external force to a local interaction element which is in opposition to and in excess of the drive force. In this case, the interaction element may be allowed to drive the drive mechanism in reverse. In this way, the position of the interaction element may be continuously monitored as it is pushed in the reverse direction, preventing measurement gaps or backlash in the system. A user would perceive backlash as a dead band in the system which would cause the touch interaction to feel less authentic. Therefore, preventing backlash in this way creates a more authentic user experience. Alternatively, the interaction element may be allowed to slip in the drive mechanism and its position may be remeasured to prevent backlash.

Figure 3A:
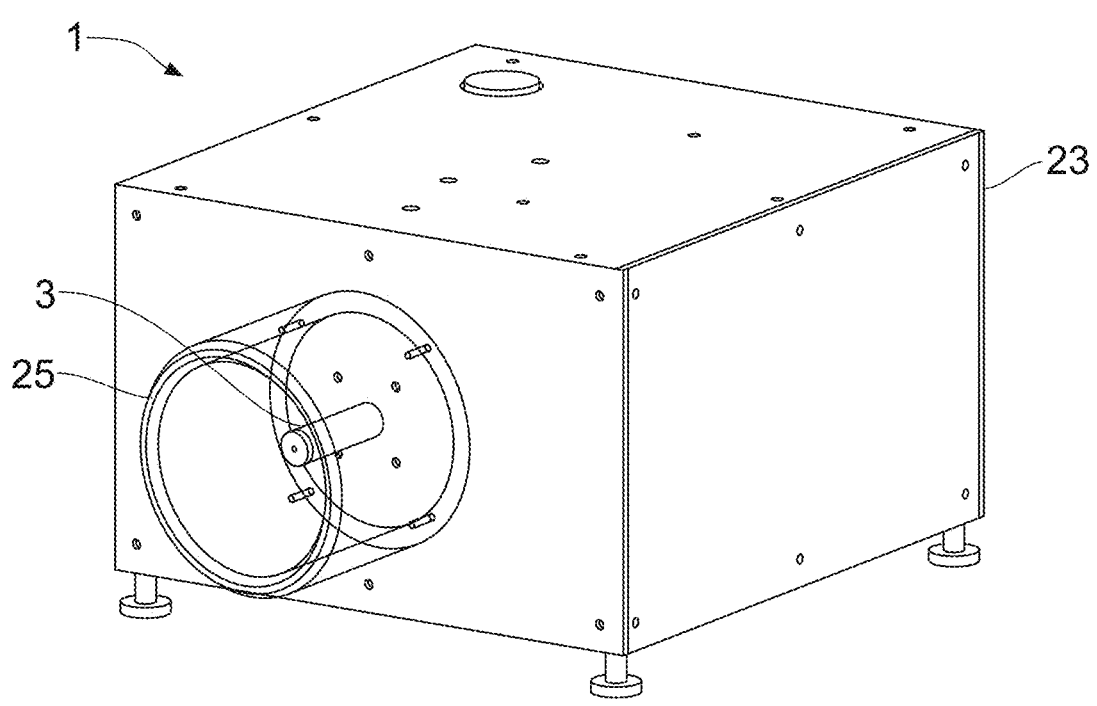
FIGS. 3A and 3B show an external perspective view and an internal perspective view respectively of a human-machine interface device.
Figure 3B:
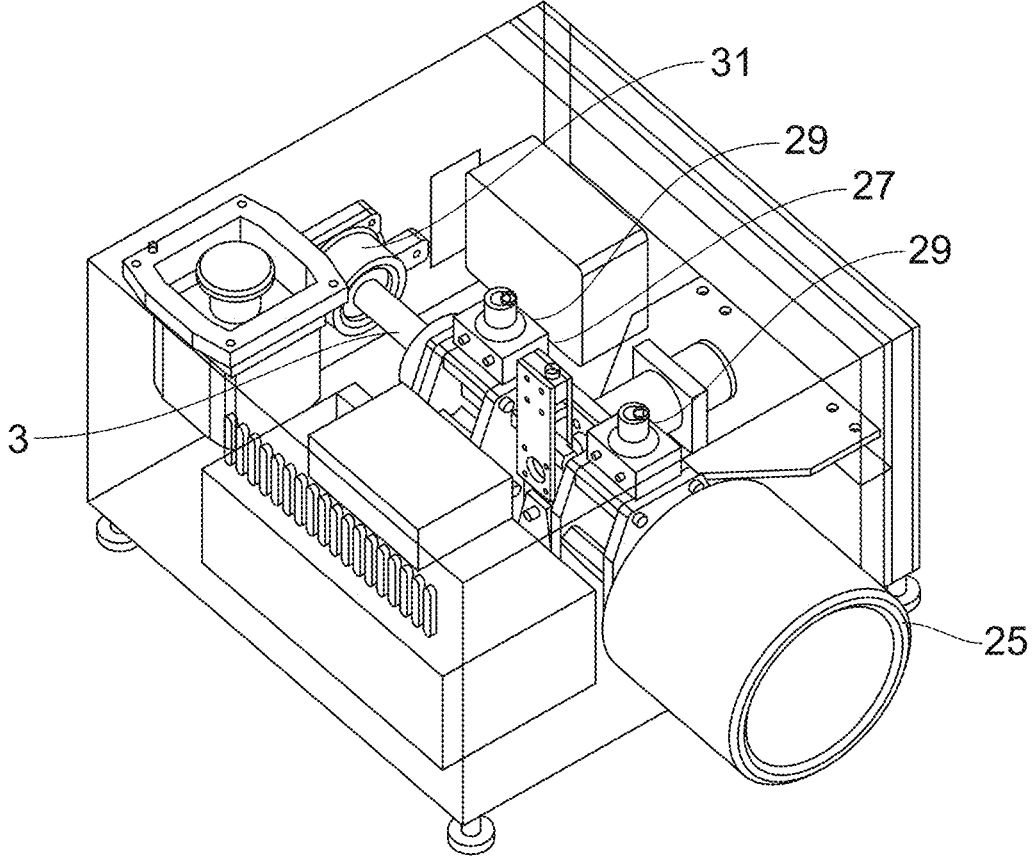
Figure 4A:
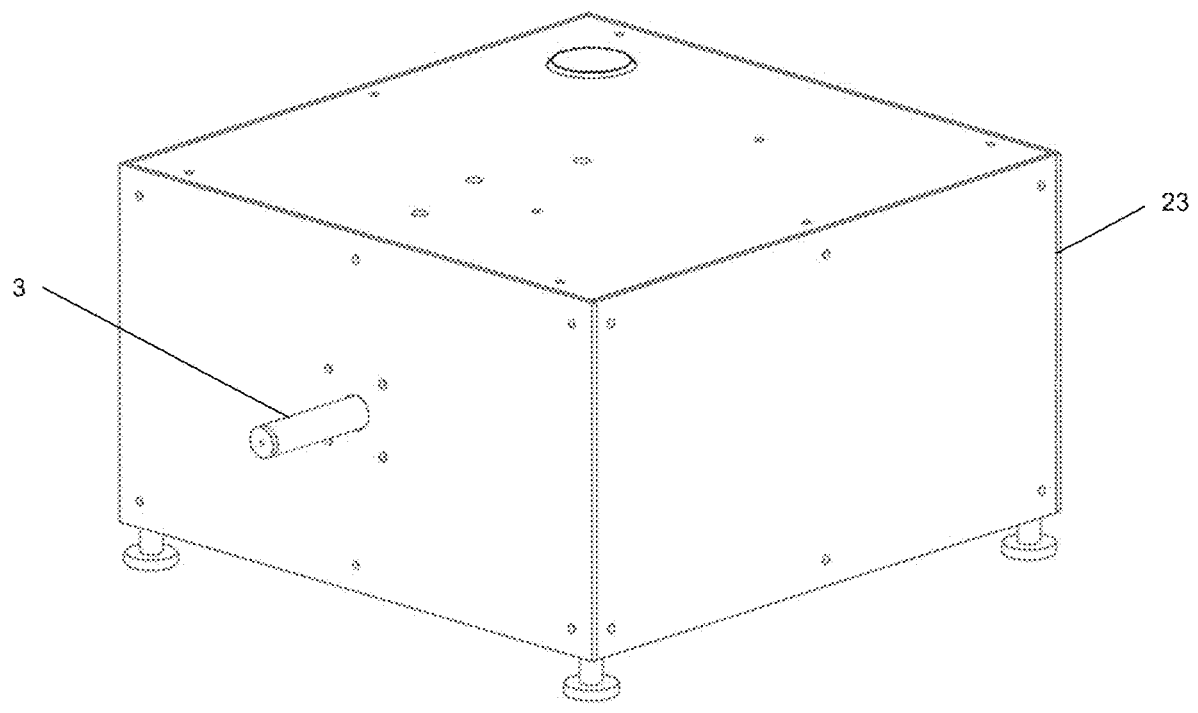
FIGS. 4A to 4D show a perspective view, two different sectioned perspective views, and a sectioned side elevation respectively of the human-machine interface device of FIG. 2A with a pin guard omitted.
Figure 4B:
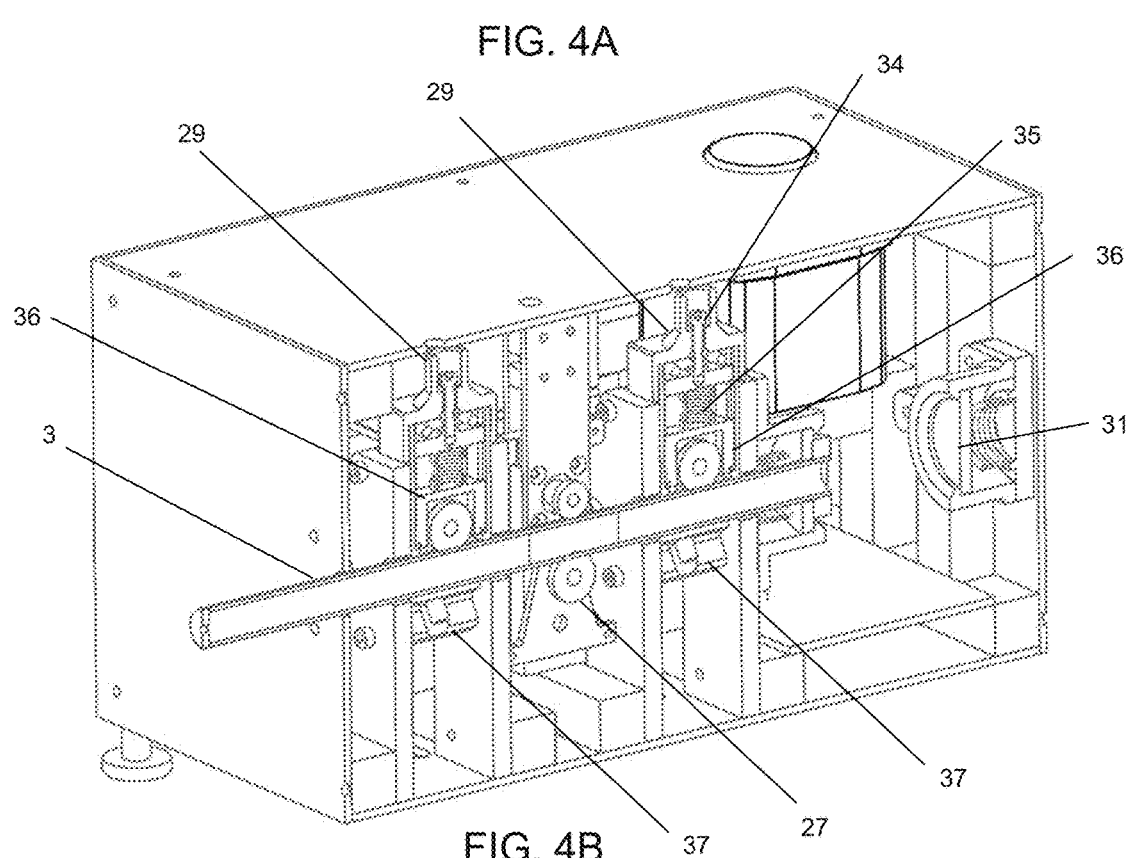
Figures 4C, 4D:
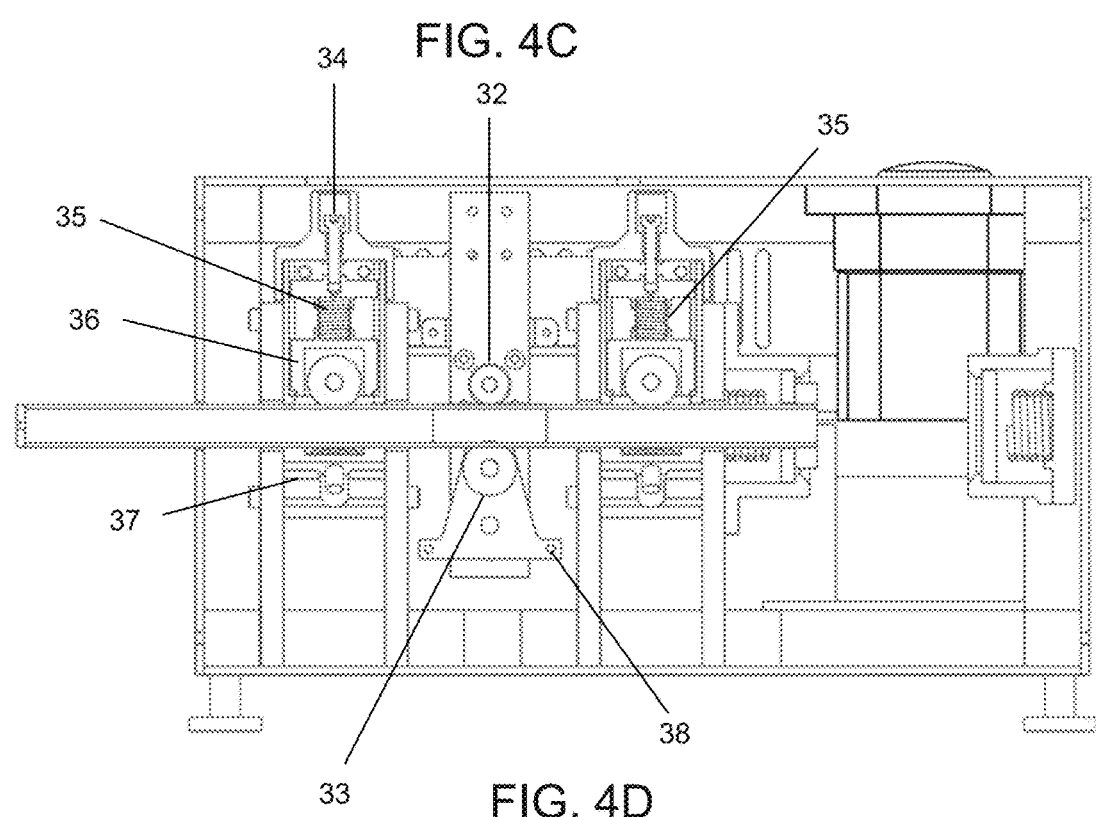
Figure 5A:
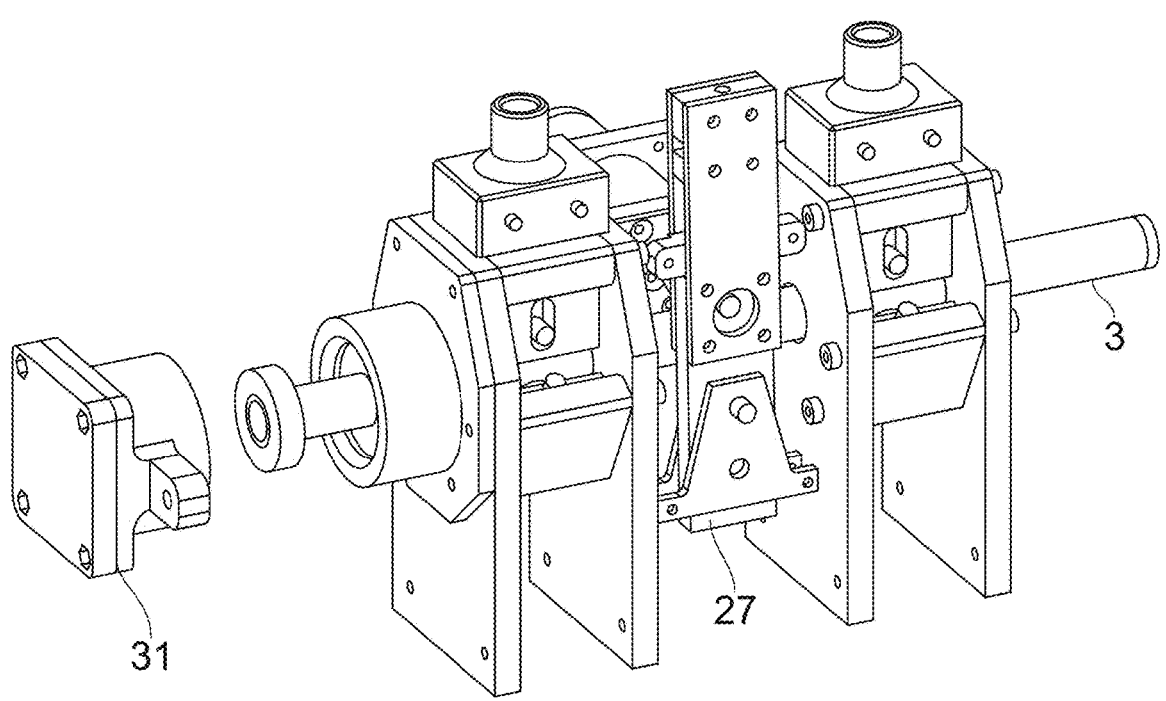
FIGS. 5A and 5B show perspective views of the drive mechanism and pin of the human-machine interface device of FIG. 3A
Figure 5B:
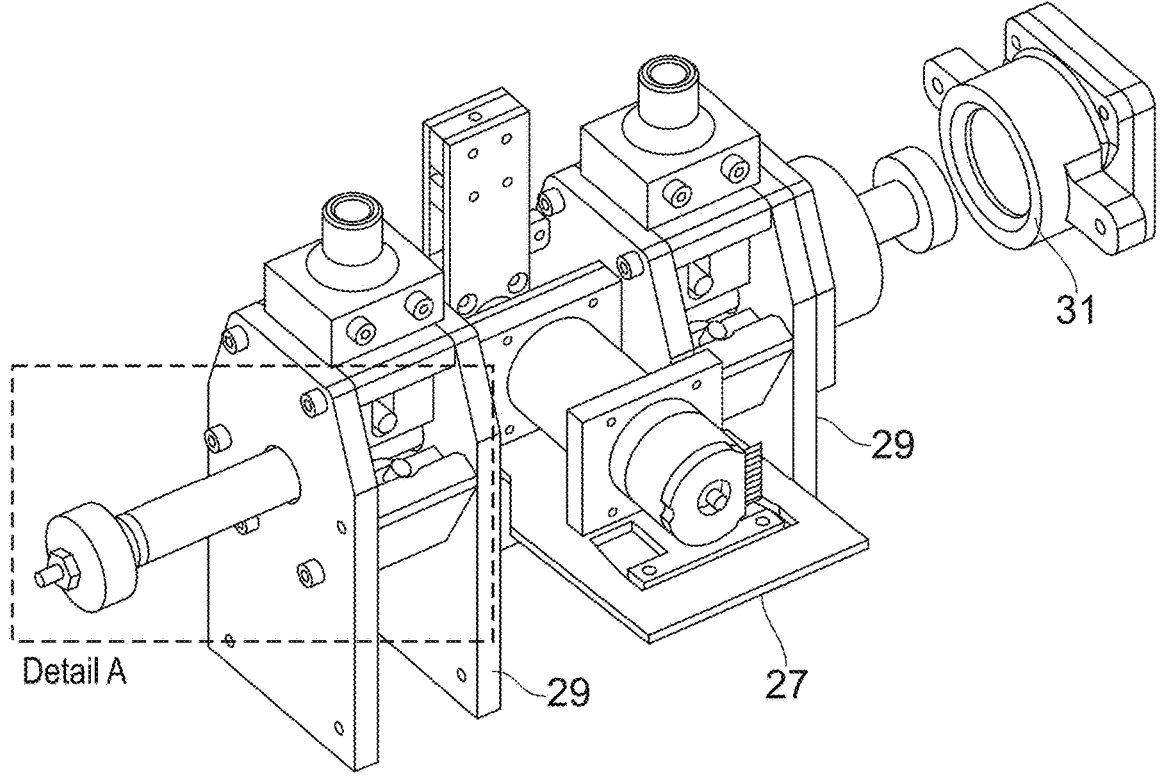
Figure 5C:
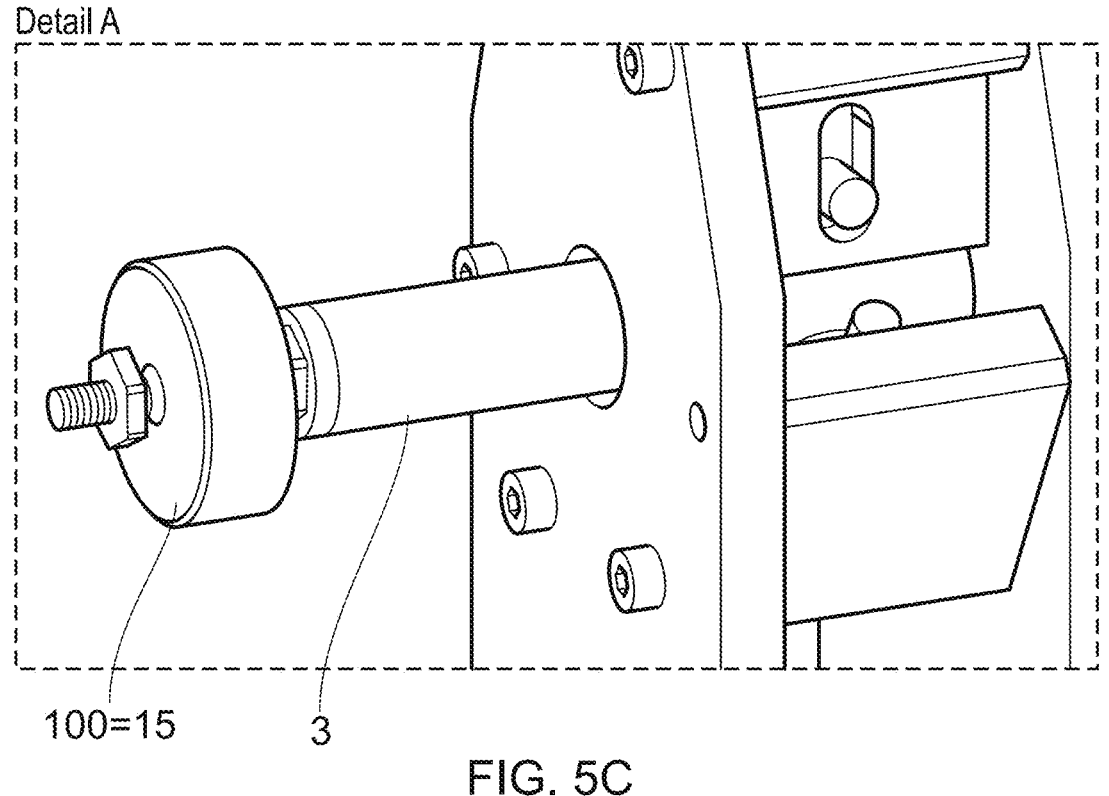
FIG. 5C shows a detailed view of region A of FIG. 5B.

FIGS. 3A and 3B show an external perspective view and an internal perspective view, respectively, of a human-machine interface device. Additionally, FIGS. 4A to 4D show a perspective view, two different sectioned perspective views, and a sectioned side elevation, respectively, of the human-machine interface device of FIG. 3A. FIGS. 4A and 4B show perspective views of the drive mechanism of the human-machine interface device of FIG. 2A and FIG. 4C shows a detailed view of region A of FIG. 4B. In the examples of FIGS. 3A to 5C the human-machine interface device comprises a sensor module 100 only including a force sensor 15, and no sensory feedback module 200.

The drive mechanism 5 and the controller 11 are contained in a housing 23. The interaction element is a single pin 3 extending from the housing. The pin is protected by a guard 25. The drive mechanism 5 is arranged to drive the pin reciprocally along its longitudinal axis such that the pin moves in and out of the device housing. Thus, in this example, the user can interact with the device by pushing on the pin.

The drive mechanism 5 is typically a brushless DC motor housed in a motor unit 27, with an internal position encoder. However, alternative drive mechanisms are possible. For instance, the drive mechanism may be a stepper motor, a servo motor, a hydraulic piston, or a pneumatic piston. The drive mechanism may also control the interaction element using electromagnets. In this case, a received force from the remote human-machine interaction device may be replicated by controlling a variable resistance which resists the movement of the interaction element. Bearing carriers 29 support the pin 3 on either side of the drive mechanism 5. Inside the bearing carriers a preload screw 34 suspends a preload springs 35 which in turn suspends a vertically floating bearing housing 36 above the interaction element. Fixed bearing housings 37 support the interaction element from below. The drive mechanism drives the pin using a drive wheel 33 below the interaction element and a drive wheel 32 above the interaction element which is directly fitted to the motor shaft. The drive wheels are held under tension via springs mounting holes 38 and the preload springs 35 in a manner similar to a locomotive drive system. This ensures a good contact with the interaction element and minimal slippage of the interaction element. A flexural motor and drive bracket 39 is fixed at one end to the housing of the human-machine interaction device to allow for small deviations in the height of the pin 3. A soft-stop damper 31 is provided to limit the maximum displacement of the pin to prevent it moving further than the operational range of the drive mechanism.

A force sensor 15 is positioned on the external facing end of the pin 3. Therefore, when the user presses on the pin they apply an external force directly to the sensor. The force sensor is an inline load cell capable of sensing forces between 0 N and 100 N. However, other force sensors may be used.

Some motor units 29 may comprise a built-in force (or torque) sensor which may perform a similar force sensing function to the force sensor 15. However, providing a sensor which is separate to the drive mechanism 5 allows a more sensitive sensor to be used. Furthermore, the external forces can be measured independently of downstream mass and friction influences as a result of the drive mechanism 5 and bearing carriers 29. Thus, including a force sensor which is separate to the drive mechanism enables more accurate and precise measurements of the external force and a better user experience.

This effect is shown in the experimental results of FIGS. 6 to 8.

FIGS. 6A and 6B show graphs of the time-varying positions of pins on local and remote devices when the devices are idling with no external forces being applied. In FIG. 6A the force sensor is a built-in torque sensor included in the drive mechanism itself. As shown in FIG. 6A the pin position slowly deviates without any user input. In additional to this deviation, there is a small (approx. 0.5 mm amplitude) oscillatory movement of the pin. In contrast, FIG. 6B shows time-varying pin positions for devices installed with separate force sensors which positioned on the external facing ends of the pins. Moreover, in FIG. 6B low-level noise in the force measurements is eliminated by applying signal thresholding. In this case, the pins remain almost stationary when the devices are idling without moving significantly from their initial positions.

Similarly, FIGS. 7A and 7B show graphs of the time-varying positions of pins on local and remote devices when a user is holding one of the pins but is not intentionally applying a force. In FIG. 7A significant oscillation and deviation of the pins is shown, whereas in FIG. 7B the system is much more stable.

Figures 8A, 8B:
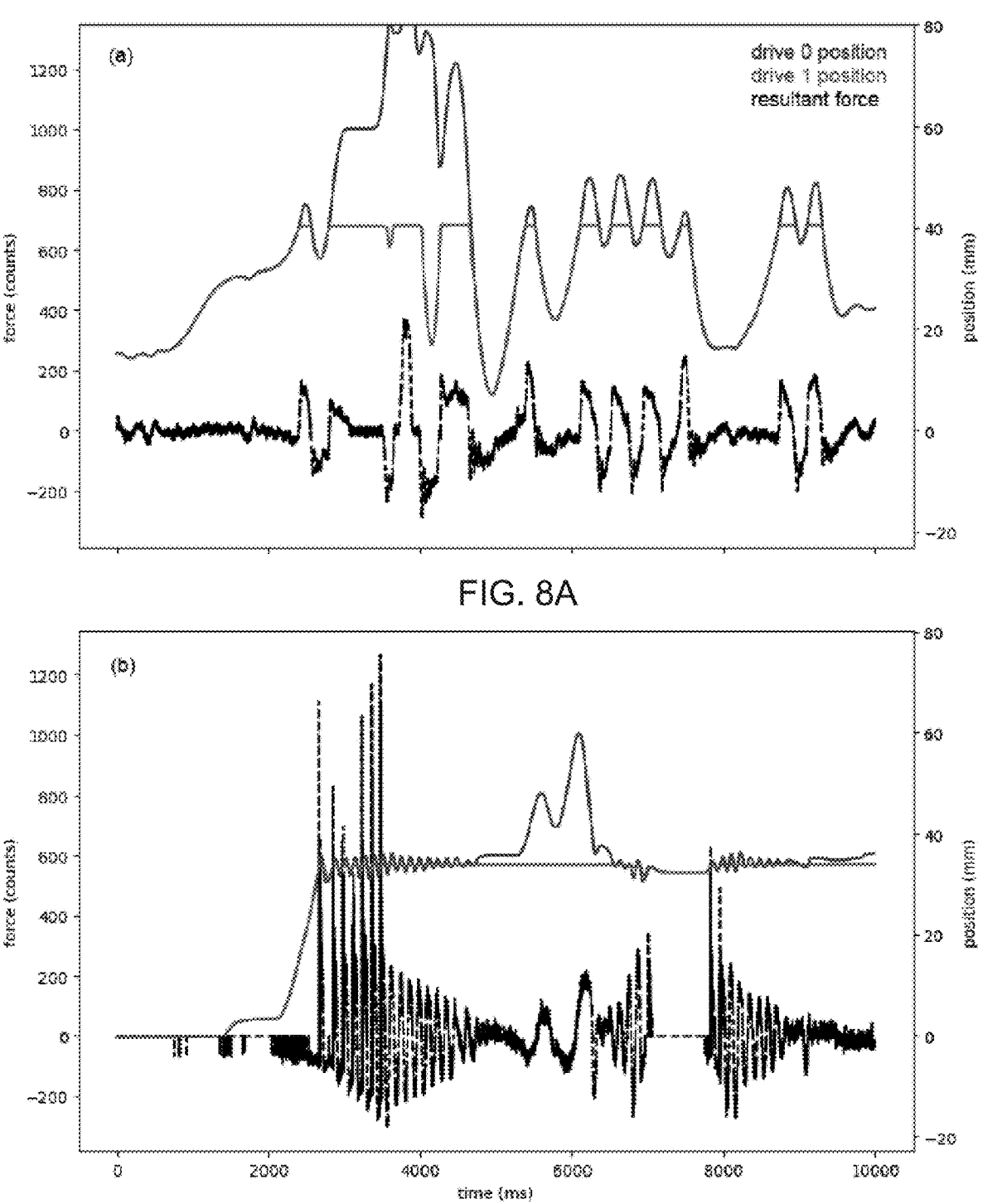
FIGS. 8A and 8B show graphs of the time-varying position of interaction elements on local and remote human-machine interface devices when one of the interaction elements encounters an obstacle; the human-machine interface devices of FIG. 8A comprising built-in force sensors in the drive mechanisms and the human-machine interface devices of FIG. 8B comprising separate force sensors on the interaction elements.

FIGS. 8A and 8B show the pin positions of local and remote pins (drive 0 and drive 1) when one pin (drive 1) encounters an obstacle. The resultant force measured with the force sensors is also shown. In FIG. 8A the force sensor is built-in to the drive mechanism and both pins display large oscillations. However, in FIG. 8B separate force sensors are provided on the external facing ends of the pins. Here, the system is much more stable and the pin (drive 1) which encounters the obstacle settles against the obstacle much more quickly than in FIG. 8A. Separating the force-sensors from the drive mechanism effectively decouples the drive system and the force sensing system reducing the potential for undesirable feedback in the control algorithm (described below).

With reference back to FIG. 2, the controller 11A controls the drive mechanism 5A according to the interaction data and the remote interaction data. Corresponding processing is performed by a controller 11B on the remote human-interface device to control the remote drive mechanism 5B. In some variants, a common controller may be provided which connects to both human-interface devices via the network and generates control instructions for the drive mechanisms of both devices. This common controller could, for example, be provided as a remote server or computing device which is arranged to receive interaction data from both network sockets 13A 13B.

The drive mechanism 5 in some examples comprises a motor controller (not shown) which is separate to the main controller 11. The motor controller may be, for example, a Faulhaber MC 5010 S motion controller which communicates with the main controller 11 over ethernet. An Ether-CAT network (https://www.ethercat.org/) may be used to exchange data between the main controller and the motor controller where the main controller is a master device and the motor controllers are slave devices. The motor controller reports motor data to the controller and receives control instructions from the controller. The control instructions comprise a desired target position for the pin. The controller 11 updates the control instructions for the drive mechanism at regular intervals determined by a system tick. Typically, this happens every 1 ms. However, this interval may be adjusted depending on a desired update rate and the processing capabilities of the controller.

Figure 9:
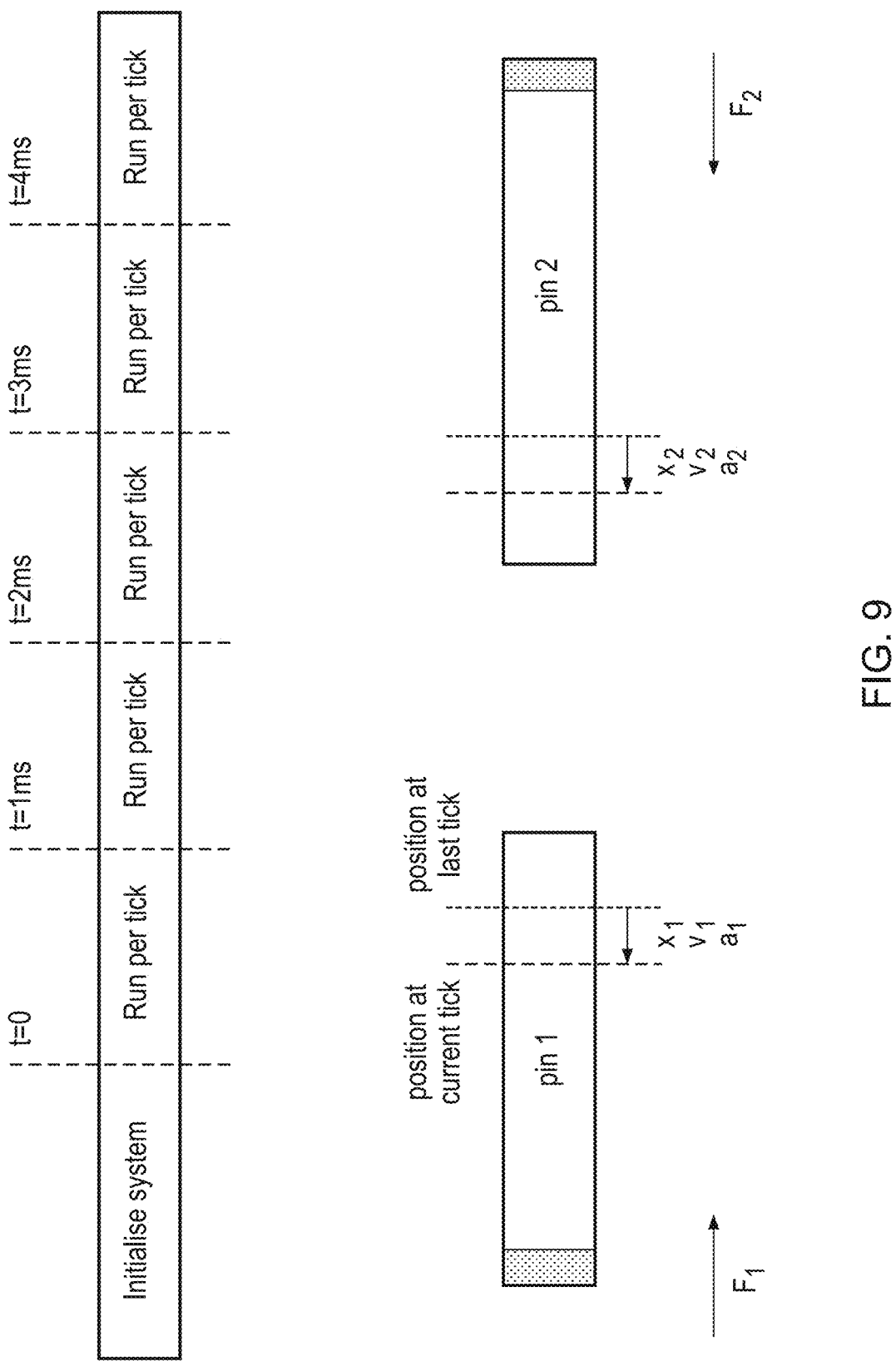
FIG. 9 shows a diagram of two interaction elements and parameters which are monitored to form interaction data and remote interaction data.

FIG. 9 shows a diagram of two interaction elements (pin 1 and pin 2 which correspond to the local and remote interaction elements 3A 3B on FIG. 2). Also shown in FIG. 9 are some of the system parameters which are measured to form interaction data and remote interaction data. The interaction data comprise the motor data reported to the controller 11A from the drive mechanism 5A, and sensor data reported by the force sensor 15A. The motor data include at least the current position $x_1$ of the local interaction element 3A. The motor data may also include the current force or torque being exerted by the drive mechanism 5A, the current velocity $v_2$ of the interaction element and the current acceleration $a_2$ of the interaction element. The sensor data comprise the current external force 9A $F_1$ being applied to the interaction element, as measured by the force sensor. Typically, the external force is reported as an amplified analogue voltage between 0 V to 10 V.

Additionally, storage is provided to store previous telemetry information about the interaction element. The previous telemetry information is typically previously received interaction data and includes, at least, a previous position of the interaction element 3A which was cached during the previous system tick. This may also include the previous velocity of the interaction element, acceleration of the interaction element and calculate net force which was applied to the interaction element. As has been discussed previously, this local interaction data (comprising the motor data from the drive mechanism 5A) are transmitted to the remote human-interface device.

The remote interaction data, received at the local human-machine interface device, comprise at least the position $x_2$ of the remote interaction element at a specified time. The remote interaction data may also comprise any of: the remote external force 9B $F_2$ applied to the remote interaction element 3B as measured by the remote sensor 15B, the previous position of the remote interaction element, the force or torque being exerted by the remote drive mechanism at the specified time, the velocity $v_2$ of the remote interaction element at the specified time, the acceleration $a_2$ of the remote interaction element at the specified time, and any other status information from the remote human-interface device. Alternatively, the position $x_2$ may be used, along with the previous position, to calculate the velocity $v_2$ and the acceleration $a_2$ of the remote interaction element. This can give more accurate estimates of the velocity and acceleration than, for example, using built-in estimates of velocity and acceleration from the drive mechanism or position encoder.

Additionally, the user may input some configurable parameters to the system at start-up via the network interface. For instance, these may include real mass $M_r$, virtual mass $M_v$, dynamic friction, and static friction. Accounting for real mass and friction allows the controller to quantify and correct for the mass and friction of the interaction elements resulting in a higher fidelity system. The virtual mass is an intended simulated mass of the interaction element. This enables the user to choose how 'heavy' the interaction element should feel. To simulate a virtual mass the drive mechanism may resist or assist movement of the interaction element to simulate added or subtracted inertia.

On start-up, the controller runs an initialisation sequence to calibrate the parameters being received from the drive mechanisms 5 and the force sensors 15. During this initialisation sequence, the controller 11 assumes the interaction element 3 is at a zero position and no external force 9 is being applied. Thus, subsequent position changes of the interaction element are measured relative to the zero position. The external force measurements (if not zero) reported by the force sensors 15 during initialisation are designated as systematic offsets and are subtracted from subsequent external force measurements.

Figure 10:
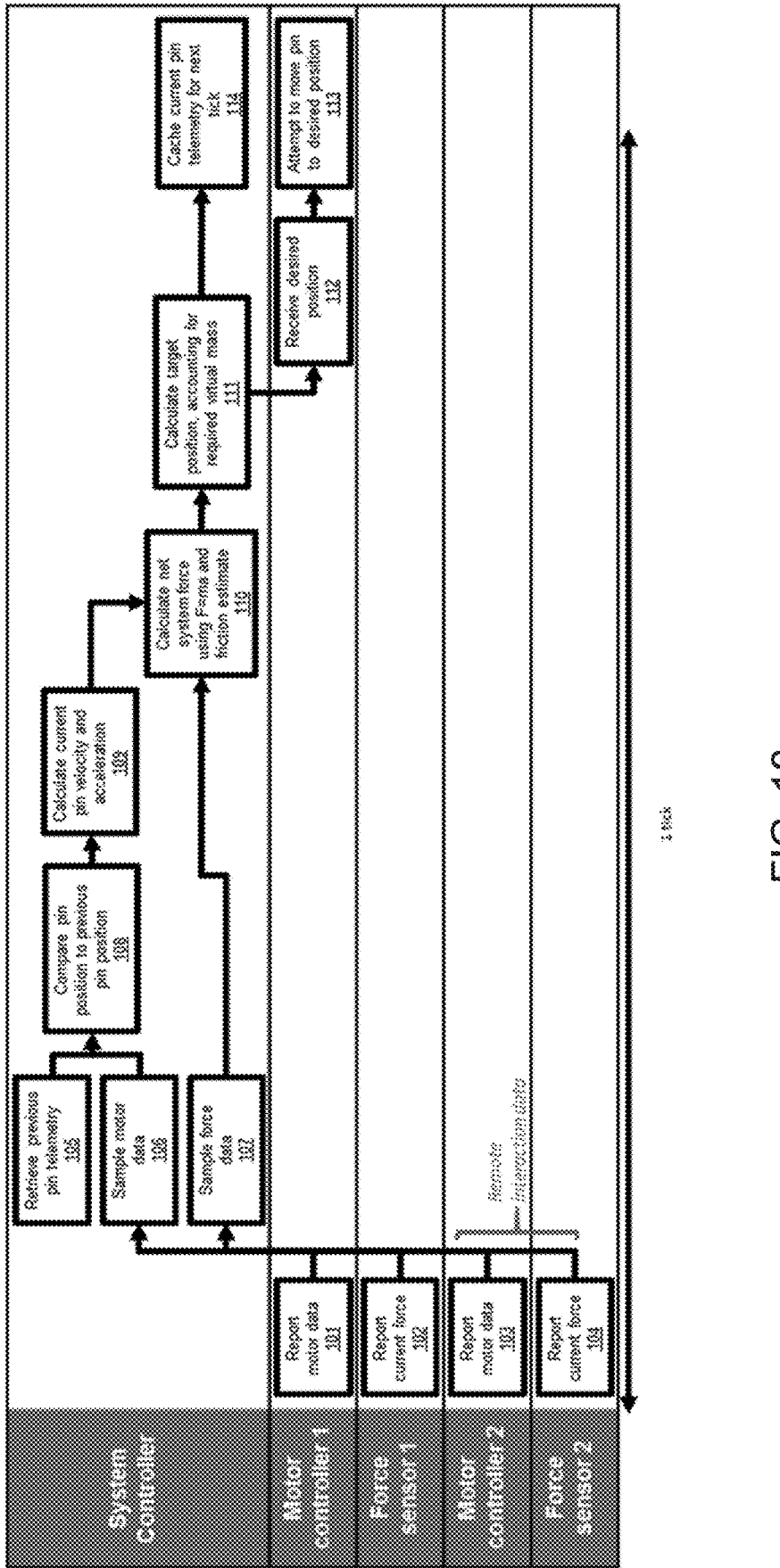
FIG. 10 shows a flow chart of the control software.

FIG. 10 shows a flow chart of the control software which is run by the controller 11 every system tick to update the control instructions for the drive mechanism 7. In this example, a system controller is provided on a local human-machine interface device which comprises "motor controller 1" and "force sensor 1". Remote interaction data are provided from a remote human-machine interface device which comprises "motor controller 2" and "force sensor 2".

First, in steps 101 to 104 the motor controllers and the force sensors on each human-machine interface device report motor data and sensor data to the controller. The controller samples the incoming motor data and sensor data in steps 106 and 107. Simultaneously, the controller also collects previous pin telemetry information in step 105, including a previous pin position from the last system tick. Next, in steps 108 and then 109, the controller uses the current position $x_1$ and the previous position of the pin to estimate the velocity $v_1$ and acceleration $a_1$ of the pin based on how far it moved since the previous system tick.

In step 110, an inertial component is calculated by combining the acceleration $a_1$ with a parameter $M_r$ which represents a real mass of the pin. The local and remote pins are considered as two ends of the same pin and are intended to move with the same velocity and acceleration. Therefore, the inertial component represents an inertial component of the same pin, comprising inertia from both the local and remote pin. The remote external force $F_2(t)$ and the local external force $F_1(t)$, as measured by the force sensors, are combined with the inertial component and an estimated friction component to produce a net system force $F_T$. The net force $F_T$ is given by:

$$F_T(t) = F_1(t) + F_2(t) + M_r a_1(t) - \frac{v(t)}{k} = M_v a(t)$$

where $F_1(t)$ is the external force measured by the force sensor; $F_2(t)$ is the remote external force received as remote interaction data; $M_r a_1(t)$ represents the inertia of the combined local and remote pins and the motor assemblies, where $a_1(t)$ is the calculated acceleration of one or both of the pins and $M_r$ is the actual mass of the combined local and remote pins; $v(t)/k$ is a modelled friction component of the motor assemblies, where k is the coefficient of dynamic friction and $v(t)$ is the velocity of the combined local and remote pins, and $M_v$ is the virtual mass of the combined local and remote pins.

In step 111, a target position is calculated, accounting for modelled system parameters such as a virtual mass, by double integrating the net system force to calculate the target position of each pin. The controller then dispatches updated telemetry information to the motor controllers instructing the drive mechanism to move the interaction element to the target position.

In steps 112 and 113 the motor controller receives the updated telemetry information and attempts to move the pin to the target position. The drive mechanism then attempts to move the pin to the target position.

In step 114, the most recently sampled current position of the pin is cached in the storage to repeat this processing during the next system tick. Step 114 may be performed in parallel to step 113 (or may be performed after, or before, so long as the target position has been calculated).

Corresponding calculations are performed by a corresponding controller on the remote human-interface device such that the interaction element of the remote device is moved to a corresponding target position according to the net system force $F_T$ and the current $x_2$ and previous positions of the remote interaction element. In this way, the target positions sent to each drive mechanism can be updated according to the applied external forces on both interaction elements and a desired simulated mass of the interaction elements.

Alternatively, an additional central processor may be provided that is connected, via the network, to both human-machine interaction devices. Here the central controller receives remote interaction data from both human-machine interaction devices and calculates updated telemetry information which is sent to the motor controller of both devices.

In some variants, a target torque or force for the drive mechanism may be calculated as opposed to a target position. In this case the target force or torque may be directly inferred from the net system force equation without the need to double integrate the equations.

In another variant, control of the drive mechanism to achieve the desired target position (or force or torque) may be handled by a software implemented PID controller. The PID controller can be tuned to continuously adjust and update the applied drive force to minimise the difference between the actual position of the interaction element and the target position of the interaction element.

Additional processing may be included to predict the motions of remote interaction elements in advance. This may limit the effects of network latency on the device response time to make the human-machine interactions feel more authentic. This may involve a machine learning algorithm such as a neural network to be trained to predict motion of the interaction elements based on past motions.

Alternative embodiments of the human-machine interface device may comprise a plurality of interaction elements and drive mechanisms. For instance, an array of pins may be provided which can sense and transmit more detail about a user's movements.

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A human-machine interface device for communicating touch interaction between two users comprising:
   an interaction element,
   a drive mechanism configured to apply a drive force to the interaction element,
   a sensor configured to measure interaction by a user with the interaction element so as to obtain interaction data,
   a network connection configured to transmit the interaction data to a corresponding human-machine interface device and receive remote interaction data from the corresponding human-machine interface device which is indicative of a second user's interaction with the corresponding device, and
   a controller configured to control the drive mechanism such that the drive force is applied to the interaction element based on the remote interaction data.

2. The human-machine interface device of claim 1 further comprising an optical sensor configured to obtain optical data which forms a part of the interaction data.

3. The human-machine interface of claim 1, further comprising a temperature sensor configured to obtain temperature data which forms a part of the interaction data.

4. The human-machine interface device of claim 1 wherein the sensor configured to measure interaction by a user with the interaction element is separate to the drive mechanism.

5. The human-machine interface device of claim 1 wherein the sensor configured to measure interaction by a user with the interaction element is positioned on an external face of the interaction element so that the sensor is directly contactable by the user, and wherein the sensor is a force sensor configured to measure an external force applied to the interaction element by the user, the interaction data comprising the external force and the remote interaction data comprising a remote external force.

6. The human-machine interface device of claim 5 further comprising a movement sensor configured to measure displacement of the interaction element due to an external force applied to the interaction element by a user, the measured displacement forming a part of the interaction data.

7. The human-machine interface device of claim 1 wherein the remote interaction data comprise any one of or any combination of a force, a displacement, a temperature, and optical data.

8. The human-machine interface device of claim 1 further comprising a display element configured to operate based on the remote interaction data and/or a temperature modifying device configured to vary its temperature based on the remoted interaction data.

9. The human-machine interface device of claim 8 wherein the controller comprises a memory device for storing a previous position of the interaction element, and/or a previous temperature of the temperature modifying device, and/or a previous display of the display element and/or telemetry information of the interaction element.

10. The human-machine interface device of claim 1 wherein the interaction element is a pin configured to move reciprocally along its longitudinal axis.

11. The human-machine interface device of claim 1 wherein the interaction data comprise a current position of the interaction element, and the remote interaction data comprise a current position of an interaction element on the corresponding human-machine interface device.

12. The human-machine interface device of claim 1 wherein the controller is configured to:
   determine a target position for the interaction element based on the interaction data and the remote interaction data, and
   control the drive mechanism such that it attempts to move the interaction element towards the target position.

13. The human-machine interface device of claim 1 wherein the controller is configured to control the drive mechanism such that the drive force applied to the interaction element is adjusted to simulate a desired virtual mass of the interaction element.

14. The human-machine interface device of claim 1 wherein the controller is configured to control the drive mechanism using a proportional-integral-derivative ("PID") controller.

15. The human-machine interface device of claim 1 further comprising one or more additional interaction elements, sensors and drive mechanisms.

16. A system comprising two or more human-machine interface devices of claim 1 wherein:
   the devices are linked by a network, and
   the interaction data from each device form the remote interaction data for the or each of the remaining devices.

17. A method of using the human-machine interface device of claim 1 comprising:
   obtaining interaction data from the sensor,
   transmitting the interaction data to the corresponding human-machine interface device via a network socket,
   receiving remote interaction data from the corresponding human-machine interface device via the network socket, and
   controlling the drive mechanism such that a drive force is applied to the interaction element based on the remote interaction data.

18. The method of claim 17, further including a step of controlling a display element to operate based on the remote interaction data.

19. The method of claim 17, further including a step of controlling a temperature modifying device to vary its temperature based on the remoted interaction data.

* * * * *